INVENTORS,
HAROLD JACOBS
RONALD C. HOFER
GEORGE E. MORRIS
EDWARD Y. HORN.

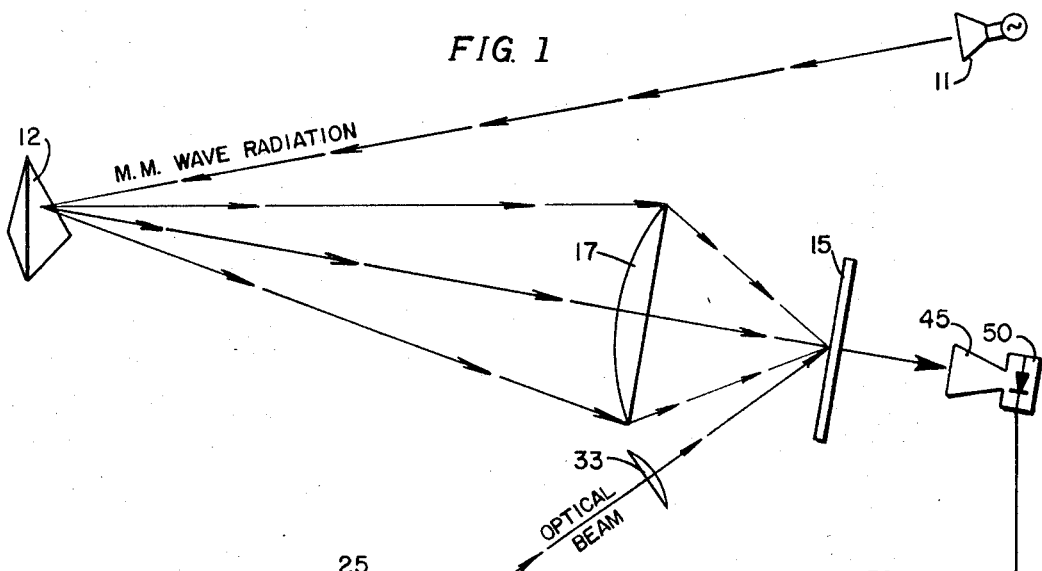
FIG. 1
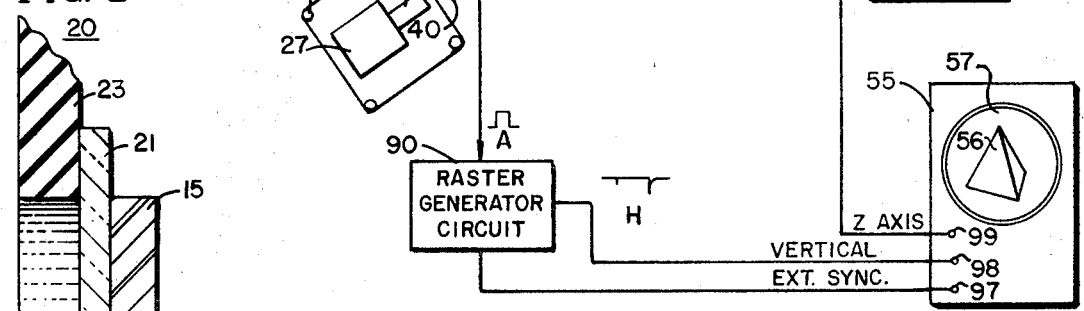
FIG. 2
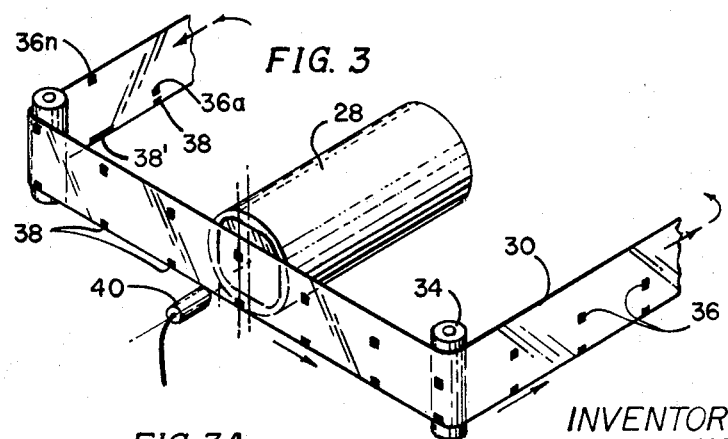
FIG. 3
FIG. 3A
INVENTORS,
HAROLD JACOBS
RONALD C. HOFER
GEORGE E. MORRIS
EDWARD Y. HORN.
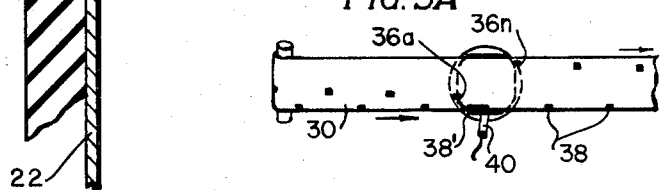
ATTORNEYS.

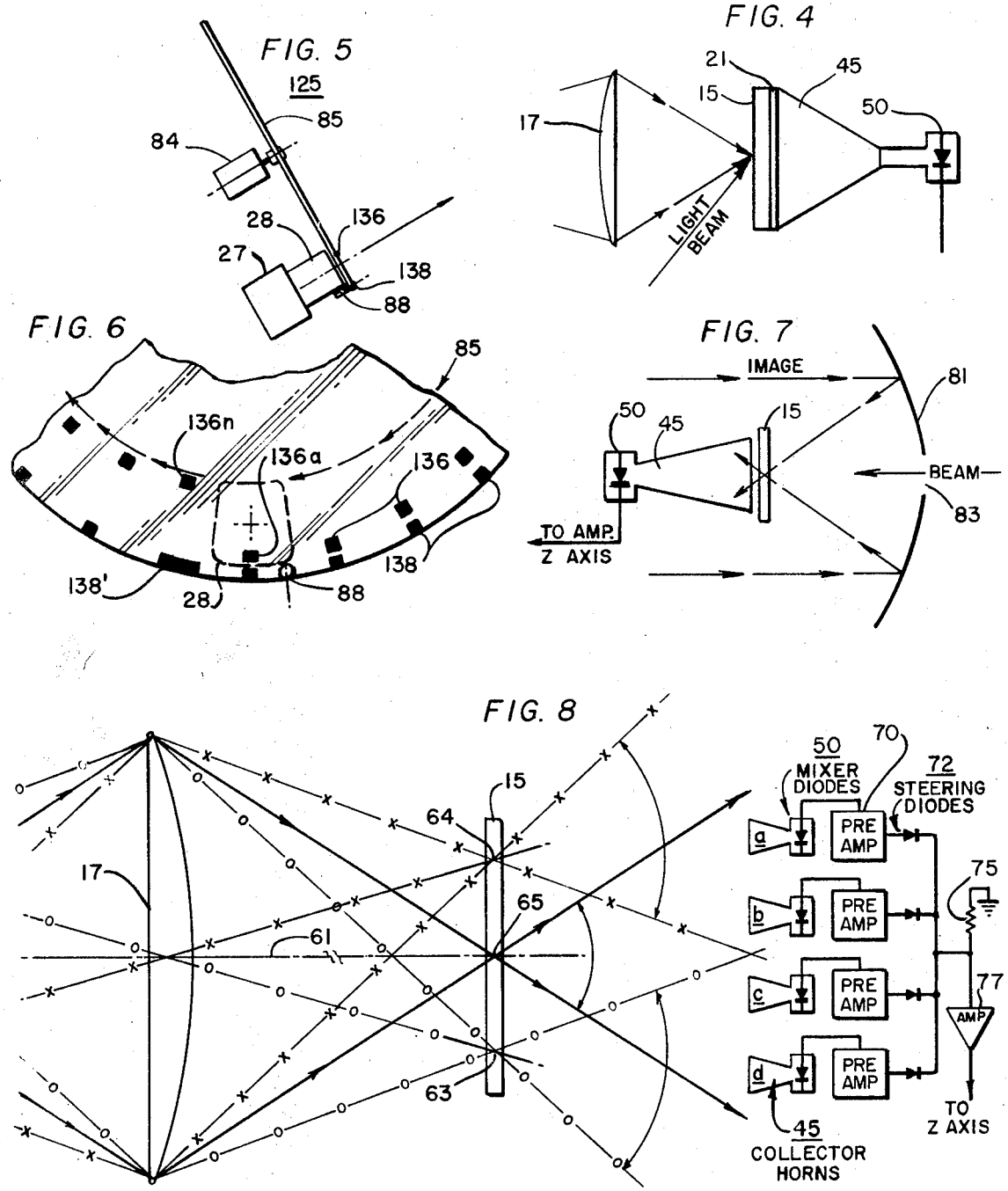

BY *Daniel D. Sharp,*
*Harry M. Saragovitz,*
*Edward J. Kelly &*
*Herbert Berl*

ATTORNEYS

United States Patent Office 3,524,016
Patented Aug. 11, 1970

3,524,016
MILLIMETER WAVE IMAGING SYSTEM
Harold Jacobs, West Long Branch, N.J., Ronald C. Hofer, West Lafayette, Ind., and George E. Morris and Edward Y. Horn, Elberon, N.J., assignors to the United States of America as represented by the Secretary of the Army
Filed July 31, 1968, Ser. No. 750,708
Int. Cl. H04n 5/30
U.S. Cl. 178—6
13 Claims

ABSTRACT OF THE DISCLOSURE

This is an improvement in a prior technique for converting millimeter wave images formed on a layer of dielectric material or a semiconductor which normally is rendered opaque to millimeter wave energy because of flooding of said layer with light energy into a visible display. This conversion is accomplished by controlling the magnitude of the millimeter wave radiation transmitted through said layer by sequentially and momentarily decreasing the conductivity of discrete regions of said layer by scanning means arranged to block off momentarily light from said discrete regions, detecting millimeter wave radiation so transmitted through said scanned regions of said layer, and applying the detected millimeter wave radiation to a visual indicating device the scanning of which is synchronized with the aforesaid scanning means.

As used in this application, "millimeter wave energy" shall be construed to include energy lying in the microwave region, as well as in the far infrared region of the electromagnetic spectrum.

The invention described herein may be manufactured, used, and licensed by or for the Government for governmental purposes without the payment to us of any royalty thereon.

BACKGROUND OF THE INVENTION

A system for converting in image formed by infrared radiation to a visible image is discussed in an article "Electronics Scanning System for Infrared Imaging" by M. E. Lasser, P. H. Cholet, and R. B. Emmons in Proc. IRE, December 1955, pages 2069–2075. In this system, an infrared image of an incoherent heat source to be viewed is formed on a semiconductor window at one end of a first tube. A second tube joined to the first tube contains an electron gun which provides a beam which can be focused on the semiconductor window. When the electron gun is inoperative, the infrared radiation continues through the semiconductor window and a portion of the transmitted radiation is intercepted by an infrared detector. When the electron beam is turned on and is swept over the semiconductor, on the other hand, the conductivity of the semiconductor increases and transmission of infrared radiation through the semiconductor decreases. A portion of the energy transmitted through the semiconductor is detected and applied to a visual indicating means, for example, to the intensity control grid of a cathode ray tube. An electronic raster may be produced across the cathode ray tube and synchronized with the scanning energy moving past the semiconductor. In this manner, the image of the energy incident on the semiconductor is displayed on the cathode ray tube screen.

One of the disadvantages of the aforesaid system of Lasser et al. is that the change in transmission of infrared radiation through the semiconductor is comparatively small and requires extremely large changes in conductivity to obtain usable effects. This, in turn, requires use of a rather high energy source of visible light or an electron beam to create the necessary density of free carriers. Also, the conductivity of the semiconductor is inversely proportional to the square of the frequency and would be lower for frequencies of the order of $10^{10}$ Hertz; this would further complicate the problem presented in the Lasser et al. system.

The variation in amount of microwave energy transmitted through bulk semiconductors with changes in conductivity induced by light or by direct current injection has been studied extensively by H. Jacobs and others, as exemplified by U.S. Pat. 3,096,494 of H. Jacobs et al. entitled "Microwave Amplitude Modulator," filed Dec. 30, 1960, and issued July 2, 1963. This principle has been extended to embrace millimeter wave imaging systems analogous to that described in the aforesaid Lasser et al. article, with one substantial modification, namely, selection of a critical thickness for the semiconductor. By making the semiconductor an integral number of half-wavelengths thick, smaller changes in conductivity are required to produce the same variation in transmissivity of the semiconductor.

The amount of wave energy directed at the detector in the quiescent state (no scanning of the semiconductor by light or electron beam energy) is considereable in the Lasser et al. system, as well as in the earlier transmission system studied by H. Jacobs et al., since transmission through the semiconductor occurs even in the absence of impingement on the semiconductor of the scanning energy. Because of the rather high background level of transmission and the consequent relatively low signal-to-noise ratio; even with critical adjustment of semiconductor thickness (as in the Jacobs et al. transmission imaging system), the transmission mode of millimeter wave imaging often is undesirable.

Another disadvantage of the prior transmission modes of imaging systems is that, when coherent radiation sources are used, adverse effects arise owing to interference from multiple images appearing simultaneously at the input of a single detector. If one examines the contribution of detected energy from two adjacent image spots which correspond to phase cancellation from portions of a coherent radiation source, the detected energy may decrease when these two spots are scanned by light or by an electron beam; on the other hand, the detected energy may increase when two such adjacent image spots arise from phase addition of two portions of a coherent radiation source. In the case of coherent radiation, this particular transmission mode of imaging, wherein the influence of the scanning on any one of the image spots is to cause a minimum intensity return to the detector for the image spot being scanned, can produce greatly exaggerated power changes when a single image spot is modulated or scanned; for a practical system with multiple image spots, this problem increases considerably and may preclude satisfactory system operation.

SUMMARY OF THE INVENTION

The invention relates to a system for achieving a visible presentation of a millimeter wave image formed on a layer of semiconductor or other dielectric material. The system of the invention distinguishes from the transmission system of Lasser et al. in that the thickness of the layer is made critical so as to maximize the change in amount of millimeter wave energy transmitted through the layer with changing conductivity; that is, the modulation depth is superior to that of the Lasser et al. system.

The system of the invention also distinguishes from the transmission system of Lasser et al. in that the scanning means is a dark spot scanner which normally permits light energy to flood the entire layer. When the layer is in this quiescent condition, the entire layer has relatively high conductivity and is substantially opaque to millimeter wave energy. In the scanning means of the Lasser et al. system, on the other hand, the layer is not exposed to scanning energy in the quiescent state and the conductivity of the entire layer is such as to permit some background transmission of millimeter wave energy through the layer at all times; this, of course, causes deterioration of the signal-to-noise ratio. In the case of the invention, when a scanner dark spot passes between the light source and the semiconductor, light energy momentarily is prevented from impinging on some discrete region of limited area of the semiconductor. For a moment, therefore, recombination of free carriers in the semiconductor occurs, and the conductivity of this region of the semiconductor is decreased; this discrete region is rendered transparent to any millimeter wave radiation that may be impinging on this region of the semiconductor to a degree dependent upon the intensity of the millimeter wave radiation image thereon. The flying dark spot scanning is synchronized with the scanning of an indicating device, such as a cathode ray tube; for example, the position of the electron beam on such a tube can be made to correspond to the position of the dark spot on the semiconductor. The cathode ray tube beam intensity is governed by the amount of detected millimeter wave radiation passing through the scanned region of the semiconductor which has been momentarily "darkened" and a visible display of the millimeter wave radiation pattern or image on the semiconductor thus is obtained. Unlike the system of Lasser et al., no inversion need be associated with the detection process, since the millimeter wave energy is transmitted through the semiconductor to the detector during the scanning process. In the Lasser et al. transmission system, transmission of energy through the semiconductor decreases during scanning. The flying dark spot scanner of the invention differs from the flying bright spot scanner of the co-pending Jacobs et al. application which, like the electron beam scanner of Lasser et al. would decrease the transmission of microwave energy through the semiconductor in the discrete regions of the semiconductor passed over by the scanning energy.

The system of the invention, unlike that of the copending Jacobs et al. application, makes use of the transmission mode, that is, the magnitude of the millimeter wave radiation transmitted through said semiconductor is controlled by sequentially and momentarily changing the conductivity of discrete regions of said layer under the influence of scanning means and the millimeter wave energy is detected and supplied to a visual indicating device. The system of the aforesaid Jacobs et al. application on the other hand, operates in the reflection mode, that is, the amount of millimeter wave energy reflected from the semiconductor is controlled by the scanning means and the variations in reflected millimeter wave energy is sensed. The transmission mode of the invention, even when the thickness of the layer is made of critical thickness in terms of the frequency of the millimeter wave radiation, is more tolerant than the reflection mode to variations in angle at which the millimeter wave radiation impinges upon the semiconductor. For example, the angle of view with the transmission mode of the invention can be of the order of 6 degrees with one collector, as contrasted with a maximum of about 3 degrees with the reflection mode described in the aforesaid copending Jacobs et al. application.

DETAILED DESCRIPTION OF THE DRAWING

FIG. 1 is a diagram of a millimeter wave imaging system in accordance with the invention;

FIG. 2 is a detailed view showing a typical semiconductor panel assembly;

FIGS. 3 and 3A are views illustrating the manner of operation of the optical scanner of FIG. 1;

FIG. 4 is a fragmentary view illustrating a modification of the millimeter wave energy collection system of FIG. 1;

FIGS. 5 and 6 are views showing an alternative form of optical scanner to that shown in FIGS. 1 and 3;

FIG. 7 illustrates an alternative form of imaging means to that shown in FIG. 1;

FIG. 8 is a diagram illustrating a multiple-collector system which is in contrast to the single collector system of FIGS. 1 and 4;

FIG. 9 is an equivalent circuit diagram explaining principles of operation of the converter panel of FIG. 1;

DETAILED DESCRIPTION OF THE PREFERRED EMBODIMENT

Figure 10:
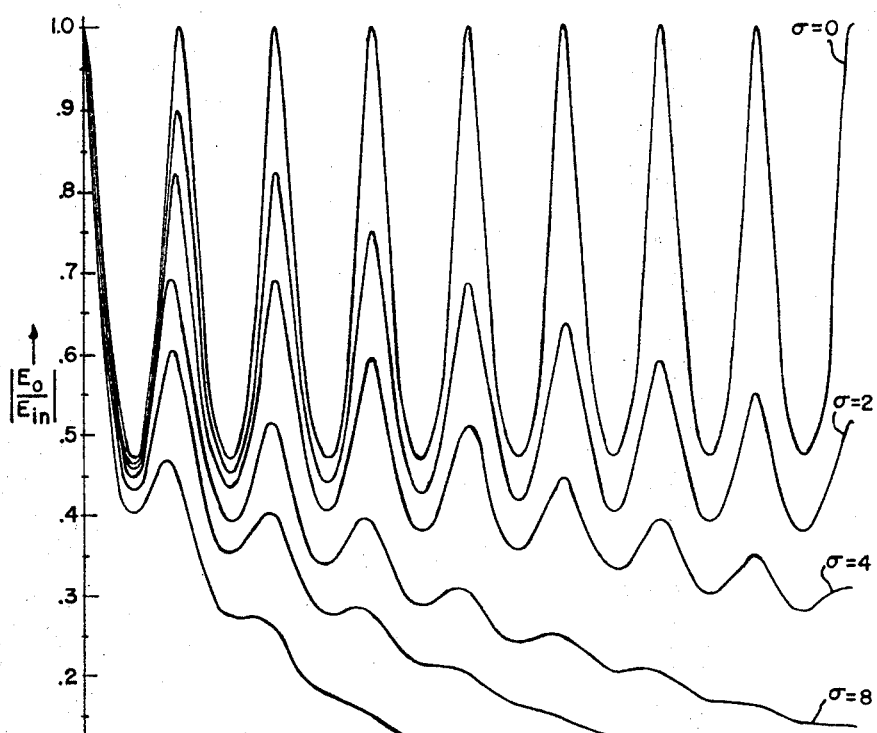
FIG. 10 are curves showing the ratio of magnitude of transmitted field to incident field as a function of normalized semiconductor thickness, with conductivity being the dependent variable.

The overall system of the invention is shown in FIG. 1. A millimeter wave generator 11 radiates energy which impinges upon one or more targets. In FIG. 1, a single target 12 is illustrated. The millimeter wave energy reflected from target 12 is collected and brought to a focus onto an image converter panel 15 of thickness L by a large diameter condensing lens 17. The minimum angle in radians between objects to be resolved (recognized as two distinct sources) is approximately equal to the ratio of the radiation wave length and the diameter of the lens 17.

The image converter panel 15 preferably consists of a semiconductor layer but may be a layer of material which will modulate millimeter wave energy by external excitation. Examples of panel materials are semiconductors such as germanium, silicon, or cadmium sulfide. The semiconductor panel 15 can be a single crystal or can be made up from a group of blocks of single crystals designed to form a panel. The semiconductor 15 should have relatively high resistivity and long lifetime for excess minority carriers. The thickness of the semiconductor preferably is an integral number of half-wavelengths in the semiconductor to optimize transmission of millimeter wave energy through the semiconductor with changes in semiconductor sensitivity.

A typical semiconductor panel assembly 20 is shown in FIG. 2 and includes a thin semiconductor slab 15 mounted on a backing member 21, such as lucite, which is transparent to millimeter wave radiation and, in the case of back surface scanning, to optical radiation. The assembly may be supported by a metal support rod 22 attached to the backing member 21. An energy absorbing material 23 such as carbon foam rubber is mounted behind the backing member 21 and frames the effective area of the panel assembly 20 through which the millimeter wave energy can pass. In one example, the semiconductor slab was made of germanium 4.28 millimeters thick, had a normal conductivity of 2.5 reciprocal ohm-meters (resistivity of 40 ohm-centimeters) and an effective size of about 10 centimeters square.

In some cases, the semiconductor 15 may be cooled with a fan or blower (not shown) to reduce the possibility of resistivity changes in the semiconductor from heat developed.

As the millimeter wave energy impinges upon the semiconductor 15, a millimeter wave image, or variable energy density distribution, will be formed on the semiconductor of configuration depending upon configuration of the object 12 being illuminated by the millimeter wave source 11 and of intensity depending partly upon the reflectivity of the various portions of the object 12 to said millimeter wave radiation. If the semiconductor 15 is irradiated with visible light, the conductivity is sufficiently high that substantially none of the millimeter wave energy will penetrate the semiconductor. If, however, a flying dark spot scanner is arranged so that the semiconductor is scanned by a dark spot at a rate compatible with the lifetime of the excess minority carriers in the semiconductor, then whenever the dark spot strikes the semiconductor, the latter will undergo an increase in resistivity (decrease in conductivity) in the region of the dark spot and the image pattern in that region will be transmitted through the semiconductor.

In order to understand better the operation of the millimeter wave imaging system of FIG. 1, reference will now be made to the equivalent circuit diagram of FIG. 9 and the curves of FIGS. 10 and 11.

Referring to FIG. 9, a transmission line equivalent circuit of the imaging system of FIG. 1 is shown. If an incident plane electromagnetic wave $E_{in}$ from some source travels through an air path of propagation constant $\gamma$ and wave impedance $Z$ and falls on a semiconductor surface of thickness $L$, propagation constant $\Gamma$ and wave impedance $Z_{02}$, some of the energy is reflected from the semiconductor and some is transmitted therethrough. In addition, a small portion of the wave energy is absorbed in the semiconductor. The magnitude of the transmitted wave $E_0$ which travels through a second air path by way of the matched impedance $Z$ of free space to the energy collection system is related to the conductivity $\sigma$ and thickness $L$ of the semiconductor 15.

It can be shown that the ratio $E_0/E_{in}$ is given by $$\frac{E_o}{E_{in}} = \frac{1}{\cosh \Gamma L + \frac{1}{2}\left[\frac{Z}{Z_{02}} + \frac{Z_{02}}{Z}\right]\sinh \Gamma L} \quad (1)$$

where $\Gamma = \alpha + j\beta$ is the propagation constant in the semiconductor
  where $\alpha$ is the attenuation constant, and $\beta$ is the phase constant, in the semiconductor, given by Equations 2 and 3
$Z_{02} = j\omega\mu/\Gamma$ is the impedance of the semiconductor where
  $\mu$ is the permeability of the semiconductor
$L$ is the thickness of the semiconductor
$Z = j\omega\mu_0$ is the impedance of free space and equals 377 ohms
  where $\mu_o$ is the permeability of free space
  $\gamma = j\beta_o$ is the propagation constant in free space
    where $\beta_o$ is the phase constant in free space
and $$\alpha = \frac{1}{\sqrt{2}}\{-\omega^2\mu\epsilon + [(\omega^2\mu\epsilon)^2 + (\sigma\omega\mu)^2]^{1/2}\}^{1/2} \quad (2)$$

and $$\beta = \frac{1}{\sqrt{2}}\{+\omega^2\mu\epsilon + [(\omega^2\mu\epsilon)^2 + (\sigma\omega\mu)^2]^{1/2}\}^{1/2} \quad (3)$$

For germanium, the dielectric constant $\epsilon_R$ is 16 and the permittivity of free space $\epsilon_0$ is equal to $\epsilon/\epsilon_R$ of $8.85 \times 10^{-12}$ farads per meter. For germanium, the permittivity $\mu$ is $1.257 \times 10^{-6}$ henrys per meter. For a frequency of 70 gHz., the wave length $\lambda_0$ in free space is $$\frac{3 \times 10^{11}}{70 \times 10^9} = 4.29 \text{ millimeters}$$

The wave length $\lambda_s$ in the semiconductor is given by $$\lambda_s = \frac{\lambda_0}{\sqrt{\epsilon_R}}$$

For a frequency of 70 gHz., and for a germanium semiconductor 15, $$\lambda_s = \frac{4.29}{\sqrt{16}} = 1.072 \text{ mm.}$$

The angular frequency $\omega$, at 70 gHz., is $2\pi \times 70 \times 10^9 = 44 \times 10^{10}$.

The Equations 2 and 3 can be solved for alpha and beta by inserting the values given above. One then is able to solve Equation 1 for the ratio $E_0/E_{in}$ as a function of semiconductor thickness $L$. Computer curves were obtained for the magnitude of the ratio of transmitted electric field to incident electric field in the semiconductor as a function of normalized thickness $X = L/\lambda_s$ with conductivity $\sigma$ as the dependent variable.

The results of the computer solution of Equation 1 are shown in FIG. 10, for a frequency of operation of 70 gHz. The curves of FIG. 10 indicate that the transmission ratio $E_0/E_{in}$ increases as the conductivity $\sigma$ of the semiconductor decreases. For example, the maximum ratios obtained for values of $\sigma$ of 0, 2, 4, 8, 12, and 20 are approximately 10, 9, 8, 7, 6 and 4.8, respectively. The effect of thickness in enhancing the transmission of energy through the semiconductor is shown clearly in FIG 10. This effective thickness is most clearly demonstrated at lower values of conductivity and, when the values of conductivity are larger, at smaller values of normalized thickness $X$. For example, when $\sigma = 0$, transmission maxima clearly occurs at integral multiples of a half-wavelength $\lambda_s$ in the semiconductor. The same pattern of variation occurs when sigma = 2 and 4 over the range of thicknesses shown. The pattern is evident when sigma = 8, 12 and 20, but only over a smaller range of thickness. From the curves of FIG. 10 it is obvious that the transmission ratio of the semiconductor is maximized, thereby enhancing the efficiency of the millimeter wave imaging system, by selecting a semiconductor panel of thickness equal to an integral number of half-wavelengths in the semiconductor.

It is important to consider the modulation depth of the semiconductor panel, which can be defined as the ratio of maximum power transmitted (with no optical illumination of the semiconductor) to minimum power transmitted (with the semiconductor flooded with light). The curves of FIG. 10 indicate that the manner of change in transmission ratio with changing $\sigma$, for a given thickness of semiconductor, varies with thickness. For example, at a thickness of one-half wavelength in the semiconductor, the transmission ratio decreases from about 0.9 to about 0.6 when $\sigma$ increases from 2 to 12. On the other hand, for the thickness of $5\lambda_s/2$, the ratio decreases from about 0.63 to 0.15 for the same conductivity increase.

Figure 11:
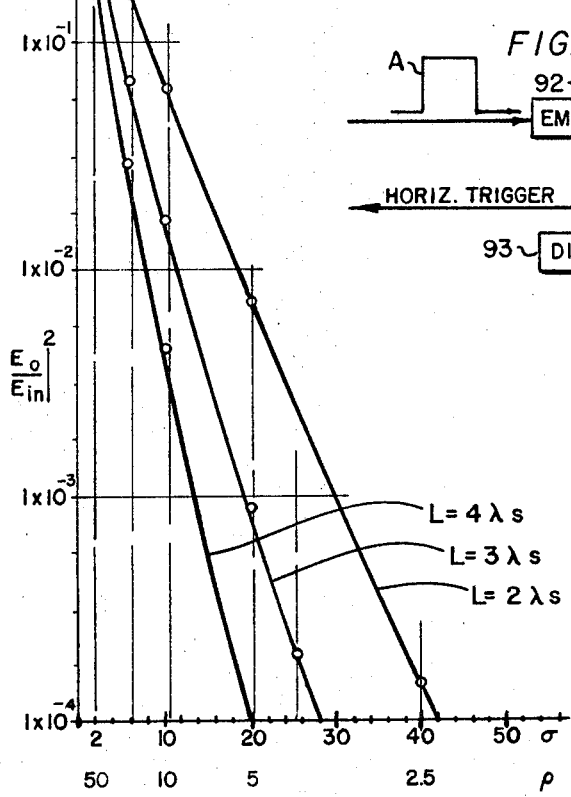
FIG. 11 are curves illustrating the ratio of power transmitted to incident power as a function of semiconductor conductivity and thickness.

This relationship is more clearly shown in FIG. 11 wherein the ratio $(E_0/E_{in})_2$ of power transmitted to incident power as a function of conductivity and thickness of a typical germanium panel is shown for an operating frequency of 70 gHz. The three curves of FIG. 11 are for a semiconductor thickness 2.14 millimeters, 3.21 millimeters and 4.28 millimeters, corresponding respectively to two, three and four wavelengths in the semiconductor. Both semiconductor conductivity $\sigma$ and its reciprocal, resistivity $\rho$, are plotted along one axis in FIG. 11.

For a semiconductor of thickness $L = 2\lambda_s$ ($X = 2$), the power transmitted increases from about $7 \times 10^{-3}$ to about $4.75 \times 10^{-1}$ as the conductivity $\sigma$ is decreased from 20 to 2. In other words, as a dark spot is focused onto the semiconductor 15, the resulting decrease in conductivity $\sigma$ of the semiconductor results in a large increase in transmission of millimeter wave energy through the semiconductor. For a semiconductor of thickness $L = 3\lambda_s$ ($X = 3$), the same conductivity decrease would result in a power increase of from just under $1 \times 10^{-3}$ to $3.5 \times 10^{-1}$. Similarly for a semiconductor of thickness $L = 4\lambda_s$ a conductivity decrease of from 20 to 2 would be accompanied by a power increase of from about $1.0 \times 10^{-4}$ to about $3 \times 10^{-1}$.

The curves of FIGS. 10 and 11 thus indicate that greater changes in millimeter wave power transmitted through the semiconductor can be expected, for a given change in conductivity of the semiconductor, if its thickness is increased. In other words, the modulation depth increases with an increase in semiconductor thickness. However, as the semiconductor thickness increases the insertion loss therethrough also increases. Consequently, in practice, a compromise must be made between insertion loss and modulation depth.

Another consideration in semiconductor panel design is illustrated in FIG. 10, namely the significance of the value of the unmodulated or "dark" conductivity. The value of conductivity $\sigma$ of a semiconductor will depend upon the composition and the purity of the semiconductor material. In some cases, the conductivity $\sigma$ of germanium may approximate zero reciprocal ohm-meter. In one embodiment of the invention, the dark conductivity of the semiconductor panel was about 2 reciprocal ohm-meters and the conductivity, when flooded with light, such as from a tungsten filament lamp, was about 20 reciprocal ohm-meters. From the curves of FIG. 10 it is evident that, for a fixed maximum conductivity, the lower the value of the dark or quiescent conductivity, the greater the change in range of the transmission ratio, and therefore, the greater the change in modulation depth for a given thickness of semiconductor. In cases of high optical energy levels, excessive heating of the semiconductor may cause the quiescent conductivity of the semiconductor to increase and decrease the modulation ratio unless the panel is properly cooled by external means.

Returning now to FIG. 1, an optical scanner 25 is shown for influencing the conductivity of the semiconductor panel 15. This conductivity can be increased by directing light from the scanner light source 27, such as an optical slide projector, onto the semiconductor panel. The light from the barrel 28 of the projector lamp, after passing through a scanning film 30 is focused by means of a scan focusing lens 33 onto the semiconductor 15. It should be noted that, although the light from the optical scanner 25 is directed onto the front surface (surface facing the object 12) of the semiconductor, it is feasible to orient the scanner 25 of FIG. 1 (and, of course, the alternative scanner shown in FIG. 5) to illuminate the rear surface of the semiconductor 15. The continuous film 30 is driven at constant speed, as by a drive motor (not shown), which may be coupled mechanically to one of the wheels 34 of the film drive mechanism; the latter is shown only schematically in FIG. 1. The scanner film 30, as indicated in FIG. 3, includes several scanner spots 36 equally spaced along the length of the film. The scanner spots 36 lie at progressively different distances from the edge of the film. As shown in FIG. 3, the first scanner spot 36a is located adjacent the bottom edge of the film 30, the second spot is slightly higher, and so forth until the last scanner spot 36n is reached; the latter spot is disposed close to the top edge of the film. The lateral difference in position of two adjacent scanner spots preferably is less than the spot size so that there is some scanning overlap. The number of scanner spot positions will determine the number of horizontal scanning lines. Associated with each scanner spot 36 is a corresponding synchronizing spot 38. The various synchronizing spots are equally spaced and are disposed along the bottom of the film 30. The size of the synchronizing spots can be substantially the same as that of the scanner spots. As each scanner spot 36 moves passed the light beam from the projector 27, a focused shadow appears on the normally flooded semiconductor.

As each synchronizing spot 38 on the film 30 moves between the projector barrel 27 and a photodiode 40 aligned with the bottom portion of the projector barrel 27, light is momentarily blocked from photodiode 40, resulting in the production of a synchronizing pulse (pulse A in FIG. 12, to be described later), of duration determined by the width of the synchronizing spot passing through the projector light beam. This synchronizing pulse is applied to the raster generator 90.

If the photocell 40 is positioned, as indicated in FIG. 3, adjacent the edge of the projector barrel, and if there is a one-to-one correspondence between the cross sectional area of the light beam emanating from the barrel 28 of the projector and the cross sectional area of the semiconductor 15, each synchronizing spot and its corresponding scanner spots will normally be aligned vertically. If the photocell 40 is placed at some other position, that is, half way between the edges of the light beam emanating from the projector, as shown in FIG. 3A, then the scanner spot 36 will be displaced along the direction of travel of the film 30 from the corresponding synchronizing spot 38 by the same amount that the photocell 40 is displaced from the edge of the light beam leaving the projector 27, assuming the aforesaid one-to-one correspondence. The area of the focused light beam can be changed by altering the size of the aperture from which light emanates from the projector barrel 28 or by changing the scanner optics, as, for example, by using a lens 33 of different focal length. If the projector barrel 28 is of circular configuration, the light beam emanating therefrom may be made of square cross section by means of a square window or aperture placed in front of the projector lens system. In this way, the light beam emanating from the projector is of substantially the same cross-sectional configuration as the semiconductor. A conical beam of light obviously could be satisfactorily focused on the square panel of FIGS. 1 and 3, provided some light spill-over at the semiconductor were tolerated. The configuration of the semiconductor is not necessarily limited to a square, however.

It should be noted that the position of the synchronizing spots must be such that no shadow therefrom is imaged by the imaging lens 33 into the semiconductor 15. The relative position of each synchronizing spot and scanner spot is maintained constant throughout the length of the film 30. The main requirement in designing the relative positions of the scanner and synchronizing spots is that the shadow imaged onto the semiconductor 15 resulting from passage of a particular scanner spot across the projector light beam should commence its travel across the semiconductor at the same instant that the synchronizing spot is passing the phototube 40.

With the dark scanner spots 36 arranged as shown in FIG. 3, and with the direction of rotation indicated by the arrows in FIG. 3, the scanning of the semiconductor 15 will start at the top and move across from right to left, as one views the front of the semiconductor (side facing the object). When the next scanner spot passes across the projector light beam, a dark spot is focused onto the semiconductor 15 which moves from right to left across the semiconductor just below the scanning line traced out during traversal of the first scanner spot across the projector beam. Although the starting scanner spot 36a is near the bottom edge of the film 30 and the last scanner spot 36n is near the top edge of said film; these spots will be projected onto the top and bottom portions, respectively, of the semiconductor 15 owing to the optical inversion effected by the scanner focusing lens 39.

It should be understood that the direction of optical scanning of the semiconductor panel can be reversed either by reversing the direction of motion of the film 30 or by placing the starting scanner spot near the top edge of the film and having each successive spot lower on the film. The alignment of the synchronizing spots 38 relative to the scanner spots and to the photodiode 40 would be changed accordingly.

The number of scanner spots 36 and the rate of movement of the film 30 is so designed that the semiconductor panel 15 is scanned optically at a rate compatible with the lifetime of excess minority carriers in the semiconductor. Whenever a dark scanner spot on the film is focused onto a discrete region of the semiconductor 15 by the scanner focusing lens 33, the resistivity $\rho$ of that discrete region of the semiconductor covered by the focused dark spot will increase since the light will be blocked out from said discrete region; consequently, the image pattern at that region of the semiconductor will be transmitted through the semiconductor.

The millimeter wave energy thus transmitted through the scanned regions of the semiconductor 15 is collected, as by a collector horn 45. This horn may be connected, for example, by a wave guide or other transmission medium, to a diode detector 50 which, in turn, feeds into an amplifier 52. The energy from millimeter wave source 11, reflected from object 12, may be modulated at a lower frequency. In such a case, the amplifier 52 would be adapted to amplify this lower frequency. The sensitivity of the system could be increased by orders of magnitude by using a superheterodyne detection system; that is, the output of a local oscillator could be applied to the detector 50, along with the collected output of collector horn 45. If the local oscillator were tuned, say, to 71 gHz. and the carrier frequency of the source 11 were 70 gHz., the amplifier 52 could then be an intermediate frequency amplifier tuned to one gHz. The amplified output of the detector 50 from amplifier 52 is applied to the Z-axis terminal 99 of cathode ray oscilloscope 55 to control the intensity of the presentation 56 on the cathode ray tube face 57.

As already mentioned, there is no inversion of the detected image with the system of the invention, unlike a system such as shown in Lasser et al. wherein a scanning light spot is used. Consequently, the amplifier 52 of FIG. 1 serves only to increase the brightness of the oscilloscope display and is not necessary for phase inversion.

As shown in FIG. 1, the collector horn 45 preferably is spaced from the semiconductor 15 in order to remove adverse standing wave effects. In the arrangement shown in FIG. 4, a collector horn 45 of relatively wide aperture is placed directly against the lucite backing 21 of the semiconductor 15 and feeds directly into detector diode 50. Although this arrangement would appear to reduce the energy loss in the collection system because of the proximity of the detector 50 and semiconductor 15, it has been found that considerable reflections occur within the collector horn of FIG. 4 which adversely affect proper transmission of millimeter wave energy to the detector.

The optimum panel-collector separation is determined experimentally and is a compromise between energy collector efficiency and effective collection angle, or the effective area of the panel over which energy can be collected. The greater the collector-semiconductor separation, the greater the angle of view. Obviously, however, as the collector is moved away from the semiconductor, the energy losses in the collection system increase.

A multiple-element collection system, such as illustrated in FIG. 8, offers a wider angle of view than the single-element collection system. In the example shown in FIG. 8, four collector horns 45a, 45b, 45c, and 45d are spaced equally from the semiconductor 15 and from one another in a vertical direction. The rays of millimeter wave energy from the outer edges of the focusing lens 17 converge on the semiconductor 15 at different points, depending upon the location of the object relative to the optic axis 61 of lens 17. For example, an object located above the optic axis 61 could be focused at some point 63 of the semiconductor 15 and energy would pass through the latter in a cone bounded generally by the dashed lines interspersed with circles. As shown specifically in FIG. 8, only the lower two horns 45c and 45d would collect energy from such an object. If the target being irradiated with millimeter wave energy from source 11 were below the optic axis 61 of lens 17, the millimeter wave energy would be focused onto the semiconductor 15 at some point 64; the energy transmitted through the semiconductor 15 in this case would be bounded more or less by the dashed lines interspersed with crosses and only the upper two horns 45a and 45b would collect energy from such a target. If the object were on the optic axis 61, the millimeter wave energy would be focused at the midpoint 65 of semiconductor 15 and all four horns 45a through 45d would fall within the volume bounded more or less by the solid lines.

Each of the horns 45a, 45b, 45c, and 45d feeds into separate diode detectors 50a, 50b, 50c, and 50d and the detected outputs are supplied to the preamplifiers 70a, 70b, 70c, and 70d, all respectively. The use of separate detectors is necessary to prevent interference effects in the energy detected by the diodes 50. The outputs of the various preamplifiers, which are substantially in phase, are fed through corresponding steering diodes 72 to a common load resistor 75 and the output across this load resistor is amplified by final amplifier 77 and applied to the Z-axis of the cathode ray oscilloscope 55. With the four-collector system of FIG. 8, the vertical angle of view would be increased to about four times that of the single-collector system of FIG. 1. Likewise, the horizontal angle of view could be increased by arranging more than one collector horn in the horizontal direction. For example, an array of two horns across and four down would yield a two-fold increase in angle of view in the horizontal direction and a four-fold increase in the vertical direction. The single-element collectors of FIGS. 1 and 4 are simpler to work with circuit-wise than the multiple-element collection system of FIG. 8 and the video type of detection can be converted readily into the superheterodyne type detection system already referred to.

In some instances, a large diameter lens 17 is necessary to obtain the resolution required for direct identification of multiple targets. Solid dielectric lenses may then become impractical, owing to increased weight, and other forms of primary optics may be needed such as stepped lenses, artificial dielectric lenses or the parabola shown in FIG. 7. The parabola 81 of FIG. 7 would replace the image focusing lens 17 of FIG. 1. The incoming millimeter wave image from a target 12 would be incident upon the parabola 81 and would be reflected to the semiconductor 15 located at or near the focus of the parabola. The scanning beam would then pass through a central aperture 83 in said parabola. The collector horn 45 would pick up the millimeter wave energy passing through the semiconductor 15 and the collected energy, after detection by diode detector 50, would be amplified and applied to the Z-axis terminal 99 of the cathode ray oscilloscope 55 of FIG. 1. Shorter wavelengths offer better resolution without increasing the aperture.

An alternative form of optical scanning is shown in FIGS. 5 and 6 and may be used in the system of FIG. 1 instead of the moving film type scanner of FIGS. 1 and 3. The alternative scanner 125 includes an optically transparent disc 85 such as clear lucite which is rotated by means of a motor 84 and is disposed between the projector 27 and the scanner focusing lens 33 (see FIG. 1). As shown in greater detail in FIG. 6, a plurality of dark synchronizing spots 138 are disposed, as by painting, on the transparent disc 85. These synchronizing spots 138 are opaque to the light beam from the synchronizing projector lamp 88. These synchronizing spots are equally spaced angularly around the periphery of the scanner disc 85. One of these synchronizing spots, that is, the last spot 138', is elongated, as shown in FIG. 6. Associated with each of the synchronizing spots 138 is a corresponding scanner spot 136; these scanner spots are spirally arranged about the disc 85. The scanning spots 136 are opaque to the scanning light beam from the projector 27. The starting scanner spot 136a in FIG. 6 is located near the edge of the disc. Each successive scanner spot 136 is farther removed from the periphery of the scanner disc and the last scanner spot 136n along the spiral array of scanner spots is the nearest one to the center of the disc. The general outline of the barrel 28 of the projector 27 and of the synchronizing lamp 88 is shown in dotted lines in FIG. 6. As noted in FIGS. 5 and 6, the small projector lamp 88 is used for synchronizing purposes and is separate from the scanner projector 27. Such an arrangement likewise could have been used in the system of FIG. 1 instead of locating the photodiode 40 of FIG. 1 in the path of the light beam from barrel 28 of projector 27.

The relative arrangement of the synchronizing and scanner spots, as well as the positioning of the photocell, is dictated by the same considerations mentioned in connection with the film scanner shown in FIGS. 3 and 3A.

The rotating film technique of FIGS. 1 and 3 has been found more practical than the disc technique of FIGS. 5 and 6, not only because it is less bulky but also that it gives a linear scan rather than an arcuate scan.

The raster generator 90 of FIG. 1, which is receptive of the synchronizing pulse A from the photodiode 40, generates a raster on the cathode ray oscilloscope 45 that is synchronized with the external line-by-line scanning of the semiconductor panel 15. A typical example is the raster used for television display in which the electron beam is deflected in a rapid, repetitive, horizontal motion while simultaneously being deflected vertically at a lower rate. The oscilloscope 55 has built-in time base generating circuits for repetitive horizontal scanning of the electron beam by generating a sawtooth voltage wave form for the horizontal deflection plates of the oscilloscope. The period of the sawtooth wave form and, hence, the rate of the horizontal deflection, is continuously variable over a large range of values and is set to coincide with the scanning rate provided by either the film or disc type dark spot optical scanner. Provision is made for controlling the start of the sawtooth wave form by applying a pulse to the external trigger input of the time base circuit. Therefore, in order to generate a raster on the oscilloscope 55 additional circuitry is required to supply horizontal synchronizing pulses and a synchronized vertical deflection sawtooth voltage waveform.

The raster generator 90 of FIG. 1 can use pulse time duration to distinguish between horizontal and vertical synchronizing signals. Such pulses are generated with the present external optical scanners 25 or 125 by blocking momentarily a light beam normally incident upon the photodiode 40. The length of time that the light beam is blocked and, consequently, the synchronizing pulse duration, is determined by the width of the shadow spot passing through the light beam. The change in resistance produced by interrupting the light beam incident on the photodiode 40 of either FIGS. 1 and 3 or FIG. 5 initiates the pulse generating action and is responsible for generation of a pulse used to trigger the horizontal sweep of the oscilloscope 55.

Figure 12:
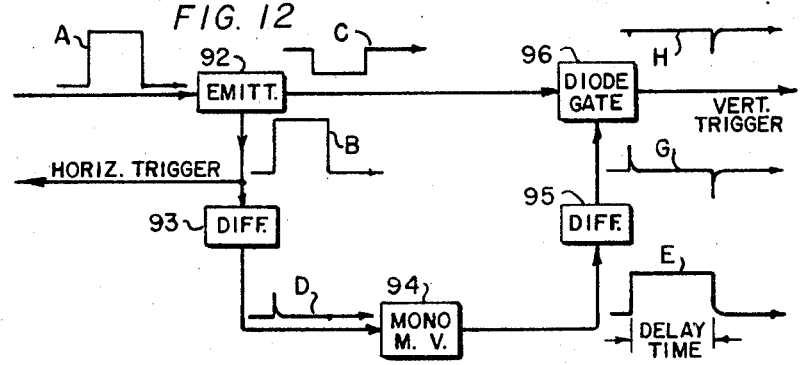
FIG. 12 is a block diagram illustrating the operation of the raster generator of FIG. 1.

Since the raster generator 90 is not considered to involve invention per se, only a brief description of the circuitry therein, is shown in FIG. 12. The photodiode trigger pulse A can cause an emitter-follower transistor amplifier stage 92 to produce a pair of pulses B and C equal in duration to the photodiode trigger pulse A. Pulse B is available at the terminal 97 of cathode ray oscilloscope 55 to trigger its horizontal sweep. The same pulse B, after differentiation and clipping of the negative-going edge by differentiating circuit 93 (see waveform D) initiates a pulse E from a monostable multivibrator 94. The latter has an adjustable duration which is set longer than the duration of the horizontal trigger pulse B. The output E of the multivibrator 94 is differentiated in differentiating circuit 95 and this output pulse G is applied to a diode gate circuit 96. Also applied to the diode gate 96 is the second output (pulse C) of the aforesaid transistor circuit 92.

The threshold on the diode gate is set such that neither the pulse C from the amplifier circuit 92 nor the differentiated trailing edge of the delay multivibrator (pulse G) alone can switch diode gate 96 into conduction. However, the long duration pulse generated by the photocell 40 which occurs on the last line of the raster, that is, the pulse A derived from photodiode 40 when the elongated synchronizing spot 38' or 138' passes the light beam, and the corresponding pulse C from amplifier 92, lasts until the differentiated delayed pulse G from the delay multivibrator arrives. The combined magnitudes of the two pulses C and G then switch the diode gate 96 into conduction and a vertical trigger pulse H is derived and made available in terminal 98 of cathode ray oscilloscope 55 for triggering the vertical sawtooth generator of the oscilloscope.

The operation of the system of FIG. 1, can be summarized as follows. A light source floods the entire semiconductor 15, rendering it conducting and substantially opaque to millimeter wave energy. As each dark scanner spot of the scanner film or disc moves through the light beam from the light source, a dark spot is focused onto the semiconductor and sequentially moved horizontally and vertically across the illuminated semiconductor. The conductivity of the semiconductor is decreased in the region across which the dark spot moves and transmissivity to millimeter wave radiation of that region of the semiconductor decreases. The amount of millimeter wave radiation, if any, transmitted through the scanned region of the semiconductor and detected by the collection-detection system is a function of the intensity of the millimeter wave image in the semiconductor at that region. Since the dark spot movement is synchronized with the position of the electron beam of the cathode ray oscilloscope, and since the electron beam intensity is governed by the output of the collection-detection system, a visible display 56 of the millimeter wave image on the semiconductor 15 and, consequently, of the object 12 so imaged, is obtained.

In millimeter wave imaging systems operating in the transmission mode with a bright spot scanner, such as exemplified by the system of Lasser et al., adverse effects would be caused by interference which arise when coherent radiation from multiple images appear simultaneously at the input to the detector. When an incoherent source of radiation is used, as clearly is the case with the Lasser et al. system, the power change produced at the detector by modulating a single image spot with a scanning light spot is not fundamentally different from that which would be derived with a scanning dark spot, since the change in power sensed at the detector in the case of an incoherent radiation is independent of the number of image spots incident on the semiconductor. In contrast to the case of incoherent radiation, phase differences exist in the case of coherent radiation and the change in power sensed at the detector when one image spot is modulated depends upon the number of image spots present. With the scanning bright spot, with N image spots incident on the semiconductor, the change in power sensed by the detector can be shown to be $(2N-1)$ times the change in power sensed when only a single image spot is present on the semiconductor. On the other hand, the change in power sensed at the detector with the scanning dark spot is independent of the number of image spots on the semiconductor, for the case of an ideal modulator, that is, no power is transmitted when the semiconductor is flooded with light.

In the case of coherent radiation pulses, the light spot scanning technique of Lasser et al. can produce greatly exaggerated power changes at the detector when only a single image spot is modulated. When the large number of possible combinations of coherent interference is considered the practicality of a system such as Lasser et al. with multiple image spots appear doubtful, if not impossible.

Summarizing, should the possibility of coherent radiation be present, only the dark spot scanning technique of the invention can be made to perform comparably with the case of incoherent radiation. The system of the invention will give substantially the same response, for equal power input, regardless of the degree of coherence of the incoming radiation.

It should be noted that the coherent problem would exist with a transmission system using a flying spot light scanner, regardless of whether or not the thickness of the semiconductor slab also is made critical.

What is claimed is:

1. A millimeter wave imaging system comprising a layer of semiconductor material which is flooded with light energy, scanning means for sequentially blocking light from discrete regions of said layer to produce a momentary decrease in conductivity of said discrete regions, means for irradiating said layer with millimeter wave energy to form a millimeter wave image on said layer, said decrease in conductivity increasing the amount of millimeter wave energy passing through said layer, means for detecting the millimeter wave energy transmitted through said discrete regions of said layer, and indicating means supplied with said detected energy and synchronized with said scanning means.

2. A millimeter wave imaging system according to claim 1 wherein said indicating means is a visual indicating means.

3. A millimeter wave imaging system according to claim 1 wherein said layer has a thickness equal to an integral multiple of a half wavelength in said layer of the millimeter wave energy.

4. A millimeter wave imaging system according to claim 2 wherein said layer has a thickness equal to an integral multiple of a half wavelength in said layer of the millimeter wave energy.

5. A millimeter wave imaging system according to claim 2 wherein said visual indicating means comprises a cathode ray oscilloscope having an electron beam raster generating means synchronized with said scanning means.

6. A millimeter wave imaging system according to claim 1 wherein said means for scanning comprises a continously moving member the major portion of which is transparent to optical energy, said member containing a plurality of spaced scanner spots which are opaque to said optical energy.

7. A millimeter wave imaging system according to claim 6 wherein said moving member further contains a plurality of synchronizing spots corresponding to said scanner spots.

8. A millimeter wave imaging system according to claim 6 wherein said moving member is a rotating disc having said scanner spots spirally arranged about said disc.

9. A millimeter wave imaging system according to claim 6 wherein said moving member is a continuous moveable film having said scanner spots spaced at progressively increasing distance from one edge of said film.

10. A millimeter wave imaging system according to claim 6 wherein said scanning means includes a light source and a focusing lens, said moving member being positioned between said light source and said semiconductor layer, said focusing lens forming a dark shadow on a discrete region of said layer during passage of a scanner spot past said light source.

11. A millimeter wave imaging system according to claim 5 wherein said means for irradiating comprises a parabola receptive of said millimeter wave energy, said semiconductor layer being disposed at the focal point of said parabola.

12. A millimeter wave imaging system comprising a layer of semiconductor material, means for illuminating said layer with light energy, scanning means for scanning discrete regions of said illuminated layer with a dark spot to momentarily decrease the conductivity of said layer at said discrete regions, means for irradiating said layer with millimeter wave energy to form a millimeter wave image on said layer, means for detecting the millimeter wave energy transmitted through said discrete regions of said layer, and visual indicating means supplied with said detected millimeter wave energy and synchronized with said scanning means.

13. A millimeter wave imaging system according to claim 12 wherein said layer has a thickness equal to an integral multiple of a half wavelength in said layer of the millimeter wave energy.

References Cited

UNITED STATES PATENTS

| | | | |
|---|---|---|---|
| 2,856,589 | 10/1958 | Kazan | 332—3 |
| 2,978,652 | 4/1961 | Thomas | 307—311 |
| 2,980,763 | 4/1961 | Lasser. | |
| 3,096,494 | 7/1963 | Jacobs | 333—81 |

OTHER REFERENCES

Lasser, Cholet, Emmons—Electronic Scanning System for Infrared Imaging—Proceedings of the/IRE—December 1959, pp. 2069–2075.

ROBERT L. GRIFFIN, Primary Examiner

J. A. ORSINO JR., Assistant Examiner

U.S. Cl. X.R.

250—43.5, 83.3; 307—311; 332—3; 333—81